United States Patent [19]
Clarke et al.

[11] 3,956,513
[45] May 11, 1976

[54] PREPARATION OF A WATER SOLUBLE ISOMERISED HOP EXTRACT

[75] Inventors: Brian James Clarke; Robert Peter Hildebrand; David George Lance, all of Melbourne; Alexander William White, Mount Waverly; Raymond Neil Skinner, Greensborough, all of Australia

[73] Assignee: Carlton & United Breweries Limited, Carlton, Australia

[22] Filed: Jan. 28, 1975

[21] Appl. No.: 544,705

[30] Foreign Application Priority Data
Feb. 4, 1974 Australia................ 6443/74

[52] U.S. Cl.................. 426/271; 426/533; 426/600
[51] Int. Cl.² ........................... A23L 1/22
[58] Field of Search .............. 426/11, 16, 192, 349, 426/223, 330, 422, 429, 431, 271, 600, 533, 650, 534

[56] References Cited
UNITED STATES PATENTS
3,607,300  9/1971  Mitchell............ 426/349
3,765,903  10/1973  Clarke et al............ 426/349

*Primary Examiner*—A. Louis Monacell
*Assistant Examiner*—R. B. Penland
*Attorney, Agent, or Firm*—Finnegan, Henderson, Farabow & Garrett

[57] ABSTRACT

A solid product for use in the flavoring of food or beverages which comprises a water-insoluble calcium, magnesium, nickel, manganese or zinc isohumolone complex and an alkali metal compound selected from sodium or potassium tripolyphosphate or a mixture of the disodium or dipotassium salt of ethylenediamine tetracetic acid with the tetrasodium or tetrapotassium salt of ethylenediaminetetracetic acid, the molar ratio of the alkali metal compound to the isohumulone present in the water-insoluble isohumulone complex being at least 0.8 to 1. The product can be immediately dissolved in water or an aqueous medium to produce a solution containing no significant amount of insoluble residues. The solution can be used, for example, as a bittering additive for beer.

12 Claims, No Drawings

PREPARATION OF A WATER SOLUBLE ISOMERISED HOP EXTRACT

This invention relates to the preparation of a water soluble isomerised hop extract or concentrate from a water insoluble metal ion-isohumulone complex, the water soluble isomerised hop extract or concentrate being suitable for use in the flavouring of food and beverages, particularly beer. The invention also relates to the prepartion of a solid isohumulone-containing product, and to the preparation of a solution of a soluble salt of isohumulone, and to the product and solution so prepared, and to the preparation of food and beverages containing said product or solution, and to the flavoured food or beverages so produced.

Utilisation of the humulones or α-acids (hereinafter referred to as "humulone" or "humulones") from the hop is a very important factor in the manufacture of beer and ale. When natural hops are used for hopping in the kettle the humulones are converted to their corresponding isohumulones or iso-α-acids (hereinafter referred to as "isohumulone" or "isohumulones") which are soluble and provide the basic bitter flavour of the beer. However, the overall utilisation of the humulones as judged by the concentration of isohumulones in the finished beer varies between 25 percent and 35%.

The methods for the preparation of simple solvent extracts of the hop have been described in previously published patent specifications and the further extension to the preparation of isomerised hop extracts is described in our Australian Patent No. 274,051 and also in different forms in our co-pending Australian patent applications Nos. 434,178 and 52643/73.

Previously described methods for the preparation of the isomerised hop extracts have involved (A) exposure of the solution containing humulones either alone or together with other extractibles from the hop to electromagnetic radiation, or (B) the isomerisation of the sodium or potassium salts of the humulones with or without other alkali soluble components of the hop by submitting them to elevated temperatures in an aqueous or aqueous alcoholic medium at a range of pHs, for example, pH5 to pH10, or (C) isomerisation of humulone in aqueous alcoholic solution in the presence of catalytic amounts of metal ions such as magnesium.

The process described in our abovementioned patent applications describe essentially a further method for the preparation of an isomerised hop extract, namely (D) the isomerisation of the divalent metal salts or complexes of the humulones in the solid or fused state by submitting them to an elevated temperature. More particularly the method (D) may comprise preparing a solution of humulones (as by extracting hops with an organic solvent, such as hexane, to give a solution of hop resins, and recovering a solution of humulones therefrom by countercurrent extraction with an aqueous solution of an alkali metal salt, e.g. potassium carbonate), precipitating the humulones from such solution in the form of a metal ion-humulone complex by adding to the solution a divalent metal ion, such as magnesium, and then heating the metal ion-humulone complex in the solid or fused state, with or without the presence of water or other liquid, to form a metal ion-isohumulone complex, e.g. magnesium isohumulate.

In the processes (A) and (B) the nature of the process results in the formation of products other than isohumulones along with the isohumulones and, in (C) as well, usually necessitates some form of concentration and stabilisation of the isomerised product.

In the processes (D), which are described in our co-pending patent applications Nos. 434,178 and 52643/73, there is described for the first time the solid or fused state isomerisation of divalent metal salts or complexes of the humulones to the corresponding divalent metal salts or complexes of the isohumulones. One advantage of these processes as detailed in the said co-pending applications over what was previously known is that the humulones may be isomerised whilst in the form of a solid metal ion-humulone salt or complex in a concentrated form requiring no subsequent concentration step prior to transportation and storage nor any stabilisation, the concentration of the isohumulone in the complex as recovered being normally in the range 50 to 75% dry weight.

The divalent metal ion-isohumulone complexes or salts of the processes (D) described in our co-pending applications Nos. 434,178 and 52643/73 differ in the method of their formation and their structure from isohumulones formed by the processes referred to in methods (A), (B) and (C). It is believed that the differences above referred to derive at least in part from the basic differences which exist between solid state reactions on the one hand and solution reactions on the other hand. The solid state processes (D) of our said co-pending applications also have the advantage that the reactions proceed rapidly and without any significant formation of deleterious degradation products, while, in addition, the isohumulone is obtained in a form which does not require stabilisation or concentration.

However, the limited solubility of these types of complexes or salts of isohumulones led to the development of a special procedure of grinding the final isomerised product prior to addition to beer or other beverages, which procedure is also described in the aforementioned co-pending applications.

The said procedure entailed essentially grinding the water insoluble metal ion-isohumulone complex or salt to a suspension of very fine particles (i.e., less than 10 microns) in water so as to enable more rapid solution when the extract is added to the beverage. This procedure is subject to the disadvantage that there is a substantial time delay (e.g. 24 to 48 hours) in effecting dissolution of the finely ground isohumulone complex in the beer or other beverage.

We have disscovered surprisingly that the water insoluble metal ion-isohumulone complex or salt formed by the processes of our said co-pending applications instead of being used in a finely ground form as described in our co-pending patent applications can according to the present invention be compounded into a product which on addition to water or an aqueous medium will be converted into or form a water soluble salt, e.g. the sodium salt or potassium salt, which can as a solution in water or an aqueous medium be added directly to the beer or other beverage with minimum time for solution or even with substantially immediate solution in the beer or other beverage. This novel product has advantages where the time required for solubilisation of a finely ground metal ion-isohumulone complex after addition to beer or other beverage is not available, for example, where the extract is added to the beverage concurrently or in close conjunction to flocculating agents such as finings or when it is added immediately prior to filtration.

In one form of the invention described herein an insoluble metal ion-isohumulone complex, preferably in finely ground or microfined form, is blended or mixed with an alkali metal compound, preferably in solid form, which in the presence of water complexes or reacts with the metal ion in the metal ion-isohumulone complex more strongly than does the isohumulone. The molar ratio of the alkali metal compound to the isohumulone present in the metal ion-isohumulone complex is at least 0.2, and preferably is at least 0.8. The product is preferably added to water or other aqueous medium to give a solution of not more than 5%, preferably not more than 2%, of isohumulones, and forms with said solution a relatively small proportion of insoluble material, the ratio of insoluble material to isohumulone in the solution being between 0:1 and 1:1, preferably between 0:1 and 0.1:1. The conversion of insoluble metal-ion isohumulone complex to a soluble alkali metal salt of isohumulone is normally at least 80%, and preferably is at least 90%.

The alkali metal compound preferably used is sodium tripolyphosphate but any other suitable agent which is in the presence of water will produce a double decomposition reaction with the insoluble metal ion-isohumulone complex may be used, e.g. alkali metal carbonates, phosphates, hydroxides or metasilicates or alkali metal salts of ethylenediaminetetracetic acid, or admixtures of these reagents.

Conversion of a product such as that described herein to a solution of a water soluble isohumulate, e.g. sodium or potassium isohumulate, may be effected in the following manner without it being in any way restrictive.

The finely milled or microfined insoluble metal ion-isohumulone complex may be blended with the solid or powdered form of sodium tripolyphosphate or other suitable alkali metal compound, and the blended product may be used as a free-flowing powder, or alternatively the blended product may be compressed into a tablet or other compressed or agglomerated form (hereinafter referred to as a "tablet").

The use of commerical tabletting machines may require the incorporation in the product of a food grade lubricant, preferably in the solid form, which is soluble in the resultant solution. For example, a salt of stearic acid, such as magnesium stearate, at levels of 0.5 to 2.5% w/w, has been found to be satisfactory for this purpose. The use of a lubricant such as magnesium stearate depends on the alkali metal compound used, and has been found desirable when tabletting a product in which sodium tripolyphosphate is employed. The breaking point of the tablet is preferably not greater than 10 S.C. hardness units, but more preferably between 2 and 5 S.C. hardness units.

The tablet or powder, when required for use, may be then added to water or other suitable solvent, preferably at a temperature in the range 0° to 40°C, with agitation, at which stage the tablet will break down, the sodium tripolyphosphate or other alkali metal compound going into solution, and effecting the conversion, to the water soluble isohumulate (e.g. sodium or potassium isohumulate), of the dispersed metal ion-isohumulone complex.

Alternatively, the microfined or finely milled insoluble metal ion-isohumulone complex, either in a compressed form or as a powder, or as a suspension in water or other suitable liquid medium, may with agitation be added to or mixed with an aqueous solution of sodium tripolyphosphate or other suitable complexing agent.

An additional advantage of the method of this invention for the conversion of the insoluble metal ion-isohumulone complex to the soluble sodium or potassium isohumulate is that the product can be stored or transported in the form of a finely milled powder or in the form of a tablet or other compressed product and added to water or an aqueous medium just prior to use. The product of this invention may be stored for extended periods without substantial deterioration under normal conditions of temperature and atmosphere. The product is stable substantially indefinitely, both biologically and physically, and consequently no special stabilising compounds are necessary.

We have also found that this novel product, in particular, the compressed or tabletted form thereof, has the following additional advantages, namely (a) that the time of solution of the product (or its solution) in the beverage is reduced, (b) that the tablet or other compressed product is less susceptible to attack by atmospheric oxygen because of its greatly reduced surface area (e.g. less than 1:2000) compared with the milled powder, which is in itself not very susceptible to oxygen attack, thereby further reducing the possibility of formation of degradation products or other deleterious substances (c) that the insoluble metal ion-isohumulone complex does not require to be as finely ground as in the case of the paste form of the extract described in our co-pending application No. 434,178 and (d) that the solution formed from the compressed product in water is substantially biologically stable requiring little or no further stabilisation.

The rate of dissolution of the tablet in solution in water or other suitable liquid medium may be regulated by varying the compression factor used in the formation of the tablet.

The concentration of sodium or potassium isohumulate in the solution formed from the insoluble metal ion-isohumulone complex is related to the degree of conversion of said complex to the water-soluble isohumulone salt. A degree of conversion in excess of 80%, preferably in excess of 90%, has been obtained. The concentration of alkali metal isohumulate in the solution is less than 5%, preferably less than 2%.

A feature of the invention is that the conditions of the reaction can be so adjusted that the soluble isohumulone complex or salt can be formed without any appreciable formation of an undesirable precipitate, e.g. a precipitate containing the metal ion originally associated with the metal ion-isohumulone complex. The ratio of said precipitate to the isohumulone in the solution is not greater than 1:1, preferably not greater than 0.1:1.

The product of this invention enables the use of simplified and more economic dosage procedures when adding the product or its solution to the beverage.

The product of the invention thus combines the advantages of solid state isomerisation described in our aforesaid co-pending patent applications and the formation of a solid, isomerised product with the advantage of obtaining a readily soluble, solid, stable, concentrated product which may in some cases be added to the beverages directly or can be used to produce a solution which is substantially biologically stable and can be added directly to the beverage with rapid solution.

The particle size of the water insoluble metal ion-isohumulone complex used in the process of this invention is not critical but preferably should be less than 200 microns as the smaller the particle size the more rapid the conversion to the soluble salt or complex. The conversion will also proceed more rapidly at higher temperatures, and normally any temperature in the range 0° to 40°C may be used.

The ratio of the alkali metal compound (e.g. sodium tripolyphosphate) to the metal ion-isohumulone complex will affect the rate and degree of conversion to the soluble form and it has been found that a molar ratio of alkali metal compound (e.g. sodium tripolyphosphate) to isohumulone present in the metal ion-isohumulone complex of 0.8 or greater (preferably 1.0 or greater) will effect a conversion of at least 80% of the insoluble metal ion-isohumulone complex to the soluble alkali metal salt e.g. when the product of this invention is added to water to give a suspension or solution 1% with respect to isohumulone. Lower molar ratios of the alkali metal compound (e.g. 0.2 to 0.8) will effect a proportionally lesser degree of conversion to the soluble salt. Alternatively, less concentrated suspensions of the insoluble metal ion-isohumulone complex will lead to a greater degree of conversion to the soluble alkali metal salt.

For example, the milled metal ion-isohumulone complex may be blended with a weight of sodium tripolyphosphate equivalent to one molar equivalent with respect to isohumulone together with a small proportion of a lubricant such as magnesium stearate and the blended powder then compressed into tablet form using a standard type of commerical tabletting machine. The tablets when required for use can for example be added to the appropriate amount of water at 40°C to yield a final solution of concentration 0.5 to 1% with respect to isohumulone and the water agitated and held at 40°C until disintegration of the tablets and conversion of at least 80% of the metal ion-isohumulone complex to the soluble sodium isohumulate has taken place, normally in less than two hours. The final solution may then be metered directly into the beverage or alternatively diluted further with water and held for a further period at 40°C to effect greater conversion to the sodium salt.

Alternatively, the milled metal ion-isohumulone complex in powder or compressed form is formed into a suspension in water or other suitable liquid medium and the suspension may be added to an agitated tank containing an aqueous solution of sodium tripolyphosphate at 40°C. Sufficient metal ion-isohumulone complex and sodium tripolyphosphate are added to the tank so that the final suspension is 0.5 to 1% with respect to isohumulone and has at least one molar equivalent of sodium tripolyphosphate for every mole of isohumulone added as th metal ion-isohumulone complex.

The following Examples illustrate the invention:

EXAMPLE 1

Dry magnesium isohumulone complex was prepared by extracting hops with an organic solvent, such as hexane, to give a solution of hop resins, from which solution the humulones were recovered by countercurrent extraction with aqueous potassium carbonate solution. The humulones were precipitated from this solution as their magnesium salts by the addition of magnesium sulphate, and the magnesium humulate was then recovered by filtration and the wet filter cake of magnesium humulate was heated to form solid magnesium isohumulone complex which was recovered and dried.

The dry magnesium isohumulone complex, milled to a particle size of less than 200 microns (1 kg) was blended with sodium tripolyphosphate (800 g) and magnesium stearate (20 g) and the final blend compressed into tablets of approximately 1 g in weight and approximately 0.5 cm thick and 1.4 cm in diameter. Analysis indicated that each tablet contained approximately 390 mg of isohumulone as the magnesium isohumulone complex.

A flask containing water (80 ml) at 40°C was agitated on a magnetic stirrer and one of the above tablets was added and agitation was continued for two hours. The concentration of insolubles present in the solution was less than .01% by weight. At the end of this period the contents of the flask were filtered and analysed for isohumulone. The aqueous phase was found to contain 0.50% isohumulone (equivalent to 100% conversion of the magnesium isohumulone complex to the soluble sodium isohumulate).

The aqueous solution was added to unfiltered unhopped fermented beer at a rate calculated to give an increase in concentration of isohumulone in the beer of 30 mg. per litre. Analysis of the beer for isohumulone content indicated an increase in concentration of isohumulone in the beer of 27 mg per litre, representing 90% utilisation of the isohumulone added to the beer.

EXAMPLE 2

Dry magnesium isohumulone complex (prepared by the method described in Example 1) milled to a particle size of less than 200 microns (500 g) was blended with anhydrous potassium tripolyphosphate (400 g). Analysis indicated that this powder contained approximately 40% isohumulone as the magnesium isohumulone complex.

A flask containing water (80 ml) at 40°C was agitated on a magnetic stirrer and a portion of the above powder (1 g) was added and agitation was continued for two hours. The concentration of insolubles present in the solution was approximately 0.25% by weight. At the end of this period the contents of the flask were filtered and analysed for isohumulone. The aqueous phase was found to contain 0.4% of isohumulone (equivalent to 80% conversion of the magnesium isohumulone complex to the soluble potassium isohumulate).

The filtered aqueous solution was metered into unfiltered unhopped fermented beer at a rate calculated to give an increase in concentration of isohumulone in the beer of 25 mg. per litre. Analysis of the beer for isohumulone content indicated an increase in concentration of isohumulone in the beer of 20 mg. per litre representing 80% utilisation of the isohumulone added to the beer.

EXAMPLE 3

A mixture of the disodium salt of ethylenediaminetetracetic acid (0.46 g) and the tetrasodium salt of ethylenediaminetetracetic acid (1.56 g) were dissolved, with agitation, in water (100 ml). To the resultant solution was added magnesium isohumulone complex, prepared by the method described in Example 1, (2.1 g), dispersed in water (50 ml) and the whole agitated for two hours. The concentration of insolubles in the solution was less than .01% by weight. The resultant solution was centrifuged and the clear aqueous phase analysed for isohumulone. It was found to contain 1.0% isohumulone, (equivalent to 100% conversion of the magnesium isohumulone complex to the soluble sodium isohumulate).

The aqueous solution was metered into unfiltered unhopped fermented beer at a rate calculated to give an increase in concentration of isohumulone in the beer of 30 mg. per litre. Analysis of the beer for isohumulone content indicated an increase in concentration of isohumulone in the beer of 25 mg. per litre, representing 83% utilisation of the isohumulone added to the beer.

We claim:

1. A water-dispersible isohumulone-containing product in solid form for use in the flavoring of food or beverages which comprises a water-insoluble metal ion isohumulone complex, said metal being selected from the group consisting of calcium, magnesium, zinc, manganese and nickel and the complex having a particle size of less than 200 microns, and an alkali metal compound selected from the group consisting of an alkali metal tripolyphosphate and a mixture of a dialkali metal salt of ethylenediaminetetracetic acid with a tetraalkali metal salt of ethylenediaminetetracetic acid, said alkaki metal being selected from the group consisting of sodium and potassium, the alkali metal compound reacting with the water-insoluble metal ion isohumulone complex in the presence of water to produce a water-soluble alkali metal isohumulone complex, the molar ratio of the alkali metal compound in the product to the isohumulone present in the water-insoluble metal ion isohumulone complex being at least 0.8 to 1, whereby when the product is added to an aqueous medium there is formed an aqueous solution of an alkali metal salt of isohumulone having a ratio of insoluble precipitates to isohumulone in the solution of not greater than 0.1 to 1 by weight.

2. A product according to claim 1 wherein the water-insoluble metal ion isohumulone complex is magnesium-isohumulone complex.

3. A product according to claim 1 wherein the water-insoluble metal ion insohumulone complex is calcium-isohumulone complex.

4. A product according to claim 1 wherein the alkali metal compound is sodium tripolyphosphate.

5. A product according to claim 1 which is compressed into the form of water dispersible tablets.

6. An aqueous solution for use in the flavoring of food or beverages, said solution containing water and the product of claim 1, the concentration of isohumulone in the solution being not more than 5% by weight.

7. A solution according to claim 6 wherein the concentration of isohumulone in the solution is not more than 2% by weight.

8. A process for the preparation of a flavored beverage which comprises adding to a beverage the solution of claim 6.

9. A product according to claim 8 wherein the beverage flavored is beer or ale.

10. A flavored beverage containing the product of claim 1.

11. A flavored beer or ale containing the product of claim 1.

12. A method for producing an aqueous solution of insohumulone for use in the flavoring of food or beverages which comprises adding to an aqueous medium, with agitation, a water-insoluble metal ion isohumulone complex, said metal being selected from the group consisting of calcium, magnesium, zinc, manganese and nickel and the complex having a particle size of less than 200 microns, and an alkali metal compound selected from the group consisting of an alkali metal tripolyphosphate and a mixture of a dialkali metal salt of ethylenediaminetetracetic acid with a tetraalkali metal salt of ethhylenediaminetetracetic acid, the alkali metal being selected from the group consisting of sodium and potassium, the molar ratio of the alkali metal compound to the isohumulone in the water-insoluble metal ion isohumulone complex being at least 0.8 to 1 and the concentration of isohumulone in the aqueous medium being not more than 2% by weight, whereby said alkali metal compound reacts with the water-insoluble metal ion isohumulone complex in the aqueous medium to produce a water-soluble alkali metal isohumulone complex, the conversion to the water-soluble salt being at least 80%, and the ratio of precipitates resulting from the reaction to the isohumulone in the solution being not more than 0.1 to 1 by weight.

* * * * *

UNITED STATES PATENT AND TRADEMARK OFFICE
CERTIFICATE OF CORRECTION

PATENT NO. : 3,956,513
DATED : May 11, 1976
INVENTOR(S) : Brian James Clarke et al It is certified that error appears in the above-identified patent and that said Letters Patent are hereby corrected as shown below:

Claim 9, line 1, "product" should read --process--.

Signed and Sealed this

First Day of February 1977

[SEAL]

Attest:

RUTH C. MASON
Attesting Officer

C. MARSHALL DANN
Commissioner of Patents and Trademarks